United States Patent
Kamble et al.

(10) Patent No.: US 9,602,416 B2
(45) Date of Patent: Mar. 21, 2017

(54) OVERLAY CAPABILITIES EXCHANGE USING DCBX

(71) Applicant: INTERNATIONAL BUSINESS MACHINES CORPORATION, Armonk, NY (US)

(72) Inventors: Keshav G. Kamble, Fremont, CA (US); Mohanraj Krishnaraj, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/053,620

(22) Filed: Feb. 25, 2016

(65) Prior Publication Data

US 2016/0182384 A1   Jun. 23, 2016

Related U.S. Application Data

(63) Continuation of application No. 14/100,137, filed on Dec. 9, 2013, now Pat. No. 9,325,617.

(51) Int. Cl.
*H04B 10/25* (2013.01)
*H04L 12/851* (2013.01)
(Continued)

(52) U.S. Cl.
CPC ......... *H04L 47/2433* (2013.01); *H04B 10/25* (2013.01); *H04B 10/27* (2013.01);
(Continued)

(58) Field of Classification Search
CPC ....... H04L 45/745; H04L 12/46; H04B 10/27; H04B 10/25
See application file for complete search history.

(56) References Cited

U.S. PATENT DOCUMENTS

2004/0213152 A1* 10/2004 Matsuoka ............. H04L 12/5693
  370/230
2010/0290467 A1* 11/2010 Eisenhauer ............. H04L 12/24
  370/392

(Continued)

OTHER PUBLICATIONS

U.S. Appl. No. 13/607,572, filed Sep. 7, 2012 (U.S. Pat. No. 8,837,476, issued Sep. 16, 2014), "Overlay Network Capable of Supporting Storage Area Network (SAN) Traffic".

(Continued)

*Primary Examiner* — Anez Ebrahim
(74) *Attorney, Agent, or Firm* — Maeve Carpenter

(57) ABSTRACT

In an approach to an overlay network capabilities exchange for reserving high priority handling of packets, a computing device creates a transport protocol port map that correlates one or more inner protocols with one or more outer transport protocol port numbers. The computing device creates a priority bit re-map table that correlates one or more outer transport protocol port numbers with one or more levels of priority. The computing device then receives a packet having an associated protocol and an associated port number, and determines, based on the associated protocol and the associated port number, that the packet requires a level of priority of the one or more levels of priority that guarantees loss-less delivery of the packet.

15 Claims, 4 Drawing Sheets

(51) Int. Cl.
    *H04L 12/741*     (2013.01)
    *H04B 10/27*     (2013.01)
    *H04L 12/46*     (2006.01)
    *H04L 12/24*     (2006.01)
    *H04L 12/931*     (2013.01)
    *H04L 12/801*     (2013.01)

(52) U.S. Cl.
    CPC ...... *H04L 12/4641* (2013.01); *H04L 41/5022* (2013.01); *H04L 45/745* (2013.01); *H04L 49/357* (2013.01); *H04L 47/193* (2013.01)

(56) References Cited

U.S. PATENT DOCUMENTS

| | | |
|---|---|---|
| 2011/0035498 A1 | 2/2011 | Shah et al. |
| 2011/0038261 A1* | 2/2011 | Carlstrom ........... H04L 12/5693 370/230 |
| 2011/0307545 A1* | 12/2011 | Bouazizi ........ H04N 21/234345 709/203 |
| 2012/0039604 A1 | 2/2012 | Dickens et al. |
| 2012/0106558 A1 | 5/2012 | Dickens et al. |
| 2012/0177047 A1 | 7/2012 | Roitshtein |
| 2012/0177370 A1 | 7/2012 | Berman |
| 2012/0287787 A1 | 11/2012 | Kamble et al. |
| 2013/0100809 A1 | 4/2013 | Gale et al. |

OTHER PUBLICATIONS

U.S. Appl. No. 14/100,137, filed Dec. 9, 2013, "Overlay Capabilities Exchange Using DCBX".

* cited by examiner

UDP PORT MAP

| PROTOCOLS | UDP PORT NUMBER |
|---|---|
| FCOE | 0xFF10 |
| FIPS | 0xFF11 |
| ISCSI | 0xFF12 |
| ROCE | 0xFF13 |
| TCP | 0xFF14 |
| . . . . . . . . | . . . . . . . . |

FIG. 3

OVERLAY CAPABILITIES EXCHANGE USING DCBX

FIELD OF THE INVENTION

The present invention relates generally to the field of networking applications, and more particularly to the use of Virtual extendable Local Area Networks (VxLAN) for Fibre Channel over Ethernet (FCoE).

BACKGROUND OF THE INVENTION

Historically, local area networks (LAN) have run on Ethernet while storage area networks often run on Fibre Channel (FC). As Ethernet moves to faster and faster speeds (100 and 400+GB), the two network standards begin to see convergence. Fibre Channel over Ethernet (FCoE) allows transmission of Fibre Channel (FC) protocols over an Ethernet structure. FCoE encapsulates FC frames to send them over Ethernet networks while preserving the original FC protocol.

The movement to FCoE can be desirable, particularly in data centers and storage networks (SAN) due to a reduction in cost in cabling, for example. FCoE may allow the use of existing hardware and infrastructure for the transmission of encapsulated FC packets. FC for storage networks, storage data, and other sensitive data, such as I/O operation packets, generally operates in a low latency, high bandwidth, and loss-less networks. Unlike FC, classical Ethernet has no flow control. To effectively execute FCoE for loss-less FC packets, FCoE needs enhanced routing capabilities and standard development to provide a loss-less environment for FCoE that prevents the dropping of Ethernet frames.

Additionally, there is a movement to virtualization for increased hardware utilization. The use of large distributed or clustered computing networks, as can be provided in cloud applications, cloud networks, or "clouds", has driven technologies such as overlay networks. An overlay network is a network which is built on top of another network. Overlay networks like Virtual extendable Local Area Networks (VxLAN) or Network Virtualization using Generic Routing Encapsulation (NVGRE); for example, have developed in response to an increased use of Virtual Local Area Networks (VLANs) which are limited to 12 bit layer 2 networks or 4094 VLAN networks. This number of VLANs may be too limiting for large data centers or cloud computing where tenants could be identified by their own VLAN. In response, overlaying virtualized networks, like VxLAN, as virtualized Layer 2 networks over Layer 3 networks allows the stretching of Layer 2 networks for highly virtualized environments. Overlay technologies like VxLAN expand the virtual LAN address space by adding a 24 bit segment ID. The addition of the 24 bit segment ID increases the number of available networks to approximately 16 million.

SUMMARY

Embodiments of the present invention disclose a method, a computer program product, and a computer system for an overlay network capabilities exchange to reserve priority handling for FCoE and other sensitive packets in an overlay network. The method includes creating a transport protocol port map that correlates one or more inner protocols with one or more outer transport protocol port numbers. The method includes creating a priority bit re-map table that correlates one or more outer transport protocol port numbers with one or more levels of priority. The method then includes receiving a packet having an associated protocol and an associated port number, and determining, based on the associated protocol and the associated port number, that the packet requires a level of priority of the one or more levels of priority that guarantees loss-less delivery of the packet.

BRIEF DESCRIPTION OF THE SEVERAL VIEWS OF THE DRAWINGS

FIG. 3 illustrates an example of a UDP port map, in accordance with an embodiment of the present invention.

DETAILED DESCRIPTION

Figure 1:
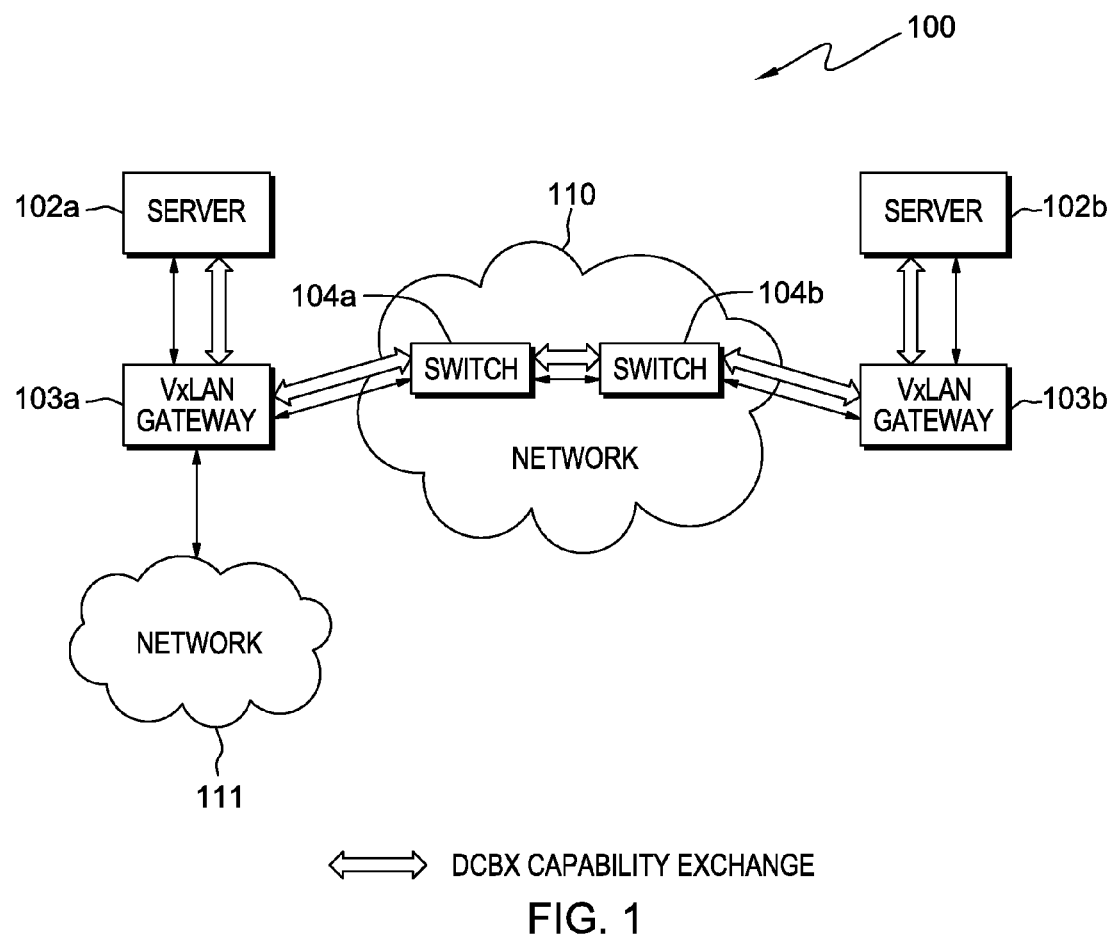
FIG. 1 is a functional block diagram illustrating a distributed data processing environment, in accordance with an embodiment of the present invention.

With the decreasing cost of Ethernet hardware, the desire to use existing hardware, and the ubiquity of Ethernet, a drive to use Ethernet for storage traffic has developed. Fibre Channel over Ethernet (FCoE) is a protocol standard that encapsulates Fibre Channel (FC) frames in Ethernet frames to allow an Ethernet network to communicate with low latency, high-performance networks, such as Fibre Channel.

Embodiments of the present invention recognize that FC and all other I/O protocols require guaranteed delivery of frames. When these sensitive protocol payloads are carried inside Ethernet based overlay networks, which do not provide guaranteed delivery, they may lose important I/O operation packets. Therefore, it is necessary when the I/O operation or FC protocols are encapsulated inside Ethernet frames and travel through overlay networks or overlay network virtual tunnels that the frames receive guaranteed delivery.

In addition, as the evolution of networking continues with virtualization, networking technologies have developed to allow the stretching of virtual machine (VM) mobility across layer 2 domains for VMs running enterprise applications. These networking virtualization technologies like Virtual extendable Local Area Networks (VxLAN), Network Virtualization using Generic Routing Encapsulation (NVGRE) and Locator/ID Separation Protocol (LISP), for example, provide a logical overlay network over L2 domains. More specifically, VxLAN may use a VLAN-like encapsulation technique to encapsulate MAC-based layer 2 Ethernet frames within layer 3 packets with user datagram protocol (UDP) as a transport protocol.

In order to utilize overlay protocols for FCoE frames carrying sensitive FC payloads, priority control and traffic conditioning may be needed to provide a reliable and loss-less data transmission in overlay environments. Overlay protocols, for example VxLAN and NVGRE, encapsulate packets into UDP/IP which is an unreliable protocol. Underlay networks, meanwhile, prioritize packets based on Institute of Electrical and Electronics Engineers (IEEE) 802.1p priority bits or default priority. Underlay networks do not understand overlay protocol packets and their requirements for guaranteed delivery. Therefore, as recognized by embodiments of the present invention, sensitive FC packets or I/O operation packets encapsulated by overlay protocol may be dropped by underlay networks.

Embodiments of the present invention propose a method to use overlay protocol, VxLAN for example, as an underlay to carry FCoE with IEEE 802.1p priorities enabled. In exemplary embodiments of the present invention, a frame tagged with IEEE 802.1p priority bits in the VLAN tag of the outer Ethernet address of the overlay encapsulated frame receives a high level of priority. The addition of IEEE 802.1p priority bits to the overlay protocol prevents inadvertent dropping of FCoE packets by the underlay network. Additionally, embodiments of the present invention propose a new application TLV for a data center bridge exchange (DCBX) protocol to be used by the server which may be a CNA (Converged Network Adapter), and the intermediate Ethernet switches to aide in the identification and communication of the special requirements for handling of sensitive FCoE packets encapsulated inside VxLAN, NVGRE, or other overlay protocols. Exemplary embodiments of the present invention further propose the development and use of new overlay port maps to help ensure the identification and prioritization of FCoE and other I/O packets for privileged handling by devices within the overlay network. While instituted at the server, for the exemplary embodiment of the present invention, the enhanced traffic conditioning and reserve high priority for the handling of FCoE in the overlay network are communicated, exchanged, and advertised on a peer to peer basis, for example, port to port in the device and device to device, for example, switch to switch. This exchange of capabilities and advertisement of ability to handle FCoE and other I/O protocols in the overlay network may be accomplished on a peer port to peer port basis through the use of Data Center Bridging Exchange (DCBX). DCBX, which is a capability discovery and exchange protocol, may communicate capabilities and special requirements, for example, IEEE 802.1p priority bits used by VxLAN devices as exchanged using type-length-values (TLVs). DCBX protocol can be extended to advertise the capability to handle sensitive packets, for example, FCoE or I/O operation packets in the VxLAN overlay network.

The exemplary embodiment of the present invention uses a transport protocol port map which is a UDP port map. The transport protocol port map creates a correlation between one or more inner protocols and one or more outer transport protocol port numbers. The UDP port map defines a range of UDP port numbers that are allocated for specific types of encapsulated overlay frames using specified protocols. For example, FCoE frames with FCoE protocol or inner protocol including FCoE control and data frames should be encapsulated in a VXLAN frame with UDP port number X where the outer transport protocol port number or UPD port number X is identified for FCoE protocol by the UDP port map. The UDP port map defines a range of UDP port numbers that are allocated for specific types of encapsulated overlay frames using specified protocols. For example, FCoE frames with FCoE protocol including FCoE control and data frames should be encapsulated in a VXLAN frame with UDP port number X where UPD port number X is identified for FCoE protocol by the UDP port map. Port X may be advertised using a DCBX TLV as the port for FCoE. Therefore, the other devices and switching devices can identify the UDP port number and provide required, guaranteed service for the FCoE frame. The reserving priority handling and VxLAN capabilities needed to guarantee delivery of sensitive packets, including the identification of sensitive FCoE packets and I/O operation packets utilizing the UDP port map, are communicated across the overlay network using DCBX TVLs.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention.

Distributed data processing environment 100 includes server 102a and 102b, VxLAN gateways 103a and 103b, switches 104a and 104b, and networks 110 and 111.

Network 110 can be a distributed computing environment utilizing clustered computers and components that act as a single pool of seamless resources, as is common in data centers and with cloud computing applications or "cloud". In other embodiments, network 110 may be implemented as a local area network (LAN), a virtual LAN (VLAN), a wide area network (WAN), such as the Internet, or a combination of these, and can include wired, wireless, or fiber optic connections. In general, network 110 can be any combination of connections and protocols that will support communications between switches 104a and 104b and other computing devices residing in network 110. In the exemplary embodiment, network 110 is an overlay network capable of utilizing virtual extensible LAN (VxLAN) protocol and Data Center Bridging Exchange (DCBX) for Converged Enhanced Ethernet (CEE). VxLAN network 110 may utilize virtual tunneling as a method of travelling through the overlay network. Switches 104a and 104b may receive and send packets from servers 102a and 102b through VxLAN gateways 103a and 103b, respectively. Each of the switches 104a and 104b can be a source of communications entering network 110 from non-VxLAN network 111 as well as an exit for communications leaving network 110 utilizing VxLAN gateways 103a and 103b. Switches 104a and 104b and VxLAN gateways 103a and 103b are shown for illustrative purposes and are not intended to limit the number or configuration of the switches and gateways that may be present in network 110 or in distributed data processing environment 100 respectively. Similarly, connections to switches are illustrated for discussion purposes and are not limited to the devices shown in FIG. 1. In other embodiments, network 110 may use another overlay protocol, for example, NVGRE or LISP.

Network 111 is a non-virtualized cloud in an exemplary embodiment. Network 111 does not utilize VxLAN overlay protocol. Non-VxLAN Network 111 is shown to illustrate VxLAN gateway functions for an FCoE frame or FC frame entering a VxLAN network from a non-virtualized cloud environment. Network 111 can be a distributed computing environment utilizing clustered computers and components that act as a single pool of seamless resources, as is common in data centers and with cloud computing applications or "cloud". Network 111 may be implemented as a part of a local area network (LAN), a wide area network (WAN), such as the Internet, virtual LAN (VLAN), a storage area network (SAN), or a combination of these, and can include wired, wireless, or fiber optic connections.

Servers 102a and 102b may be a personal computer, laptop computers, a tablet computer, a netbook computer, a desktop computer, a personal digital assistant (PDA), or any electronic device capable of running virtual server platform software programs. Servers 102a and 102b are connected to VxLAN gateways 103a and 103b, respectively. Servers 102a and 102b may be connected to each other utilizing VxLAN gateways 103a and 103b, respectively, through network 110. In the exemplary embodiment, Virtual Tunnel Endpoints (VTEPs) reside on servers 102a and 102b in the hypervisor layer of the physical server. Acting as an ingress device for the overlay network, server 102a (VTEP) encapsulates frames in VxLAN headers. In the exemplary embodiment of the present invention, server 102a creates a DCBX TLV with UDP port map which correlates a specific packet protocol to a port number for application mapping along with a TLV with IEEE 802.1p priority bit re-mapping table. In the exemplary embodiment, server 102b will receive the DCBX TLVs from VxLAN gateway 103b. Server 102a sends the DCBX TLVs to VxLAN gateway 103a and to all ports on the server. As one knowledgeable in the art would recognize, either server 102a or 102b may create these DCBX TLVs and application mapping for the network. Similarly, as one knowledgeable in the art would recognize, both server 102a and server 102b may act as an entry or ingress device or an exit or egress device for the overlay network. Servers 102a and 102b may have several virtual machines (VMs) and include internal and external hardware components, as depicted and described in further detail with respect to FIG. 4.

VxLAN gateways 103a and 103b can be a feature of a router, a server, or other computing devices, for example, any PC, desktop computer, network connectivity device, or other computing hardware, or software capable of executing gateway functions, such as protocol translators, for example, that can provide system and network interoperability. VxLAN gateways 103a and 103b may contain devices such as protocols translators, signal translators, and rate convertors to establish mutually acceptable administrative procedures between networks 110 and a non-VxLAN network. In exemplary embodiments, VxLAN gateway 103a serves as an entrance and an exit point for remote network 111 to network 110 where network 111 is a non-VxLAN network.

If network 111 is a SAN, for example, VxLAN gateways 103a may encapsulate a FC packet in FCoE and encapsulate FCoE packets in VxLAN headers. VxLAN gateway 103a may forward encapsulated packets to VTEP at server 102a. VxLAN gateway 103b may also act as an entrance point for non-VxLAN networks from a non-virtualized cloud environment and perform similar functions. Both VxLAN gateways 103a and 103b may serve as exit points for network 110. VxLAN gateway 103a and 103b may provide services needed for packets to exit network 110 and enter a non-VxLAN network. To exit network 110 and enter network 111, the frames may be decapsulated, UDP/IP and VxLAN headers removed, and packets routed to their final destination address which could be a FC target in network 111, for example. In some embodiments, VxLAN gateways 103a and 103b may tag VLAN tags with IEEE 802.1p priority bits. While shown as VxLAN gateways 103a and 103b, these gateways in other embodiments could be configured to support another overlay protocol, for example, NVGRE gateways for a NVGRE network interfacing into a non-NVGRE network. In some embodiments, VxLAN gateways 103a and 103b may be a Virtual Tunnel Endpoint (VTEP). VxLAN gateway 103a and 103b receive the DCBX TLV with UDP port numbers and application mapping along with a TLV with IEEE 802.1p priority bit mapping from server 102a and switch 104b, respectively. VxLAN gateway 103a sends the DBCX TLVs to all ports on VxLAN gateway 103a and to switch 104a. VxLAN gateway 103b sends the DBCX TLVs to all ports in the gateway 103b and to server 102b.

Switches 104a and 104b may be a desktop switch device, a rack-mounted switch device, a switch chassis with swappable module cards or a DIN rail-mounted switch device, or other computing device that can be capable of performing switching operations. Switches 104a and 104b receive and transmit messages from each other through network 110 and may also receive and transmit messages from other computing devices via network 110 for processing. In some cases, switches 104a and 104b may receive and transmit data from other networks and may act as intermediate devices in the network. In addition to communicating with each other and various components and devices in network 110, in the exemplary embodiment, switches 104a and 104b communicate with VxLAN gateways 103a and 103b, respectively. Switches 104a and 104b receive the DCBX TLV with UDP port numbers and application mapping along with the DCBX TLV with IEEE 802.1p priority bit re-mapping table from VxLAN gateway 103a and switch 104a, respectively. Switch 104a sends the DCBX TLVs to all ports on switch 104a and to switch 104b. Switch 104b receives the DCBX TLVs and sends the DCBX TLVs to all ports on switch 104b and to VxLAN gateway 103b. If switches 104a and 104b have the capability to re-stamp or correct IEEE 802.1p priority bits tagged in the outermost header (VLAN header), the correct IEEE 802.1p priority bits are tagged at egress from the switch. Additionally, switches 104a and 104b install polices with high priority to handle priority tagged packets with the UDP port numbers identified in the DCBX TLV.

Figure 2:
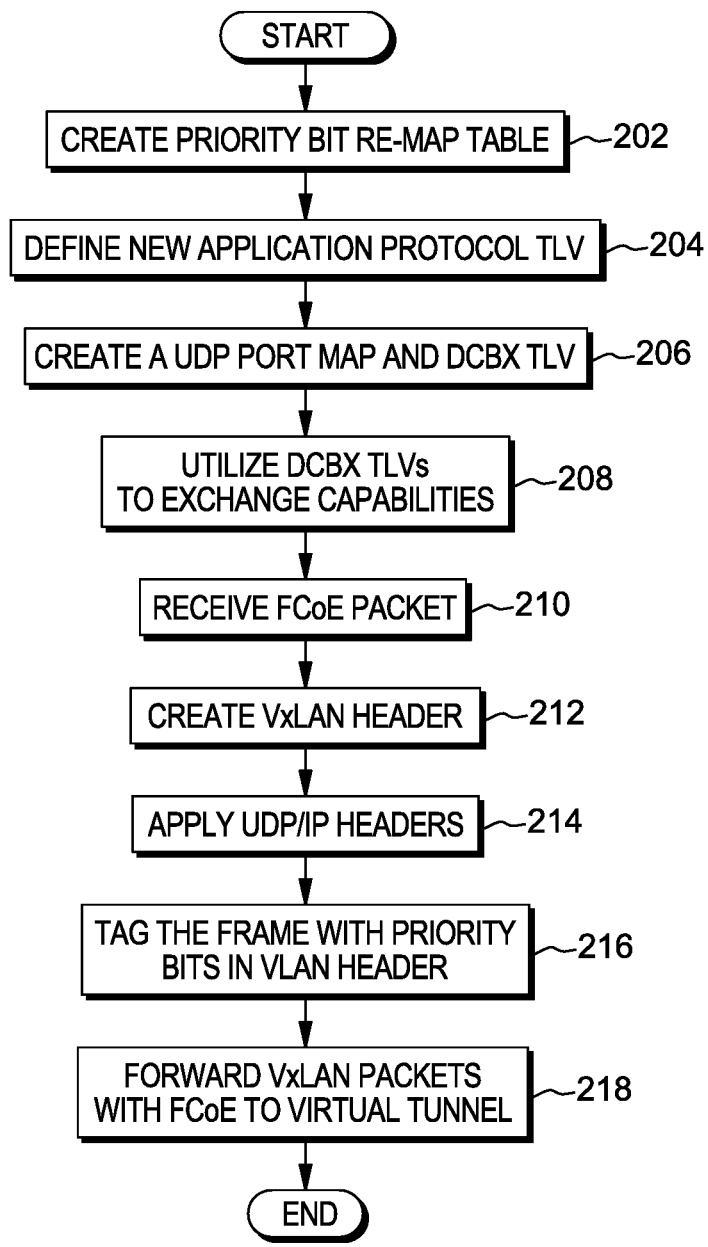
FIG. 2 is a flowchart depicting operational steps of a VxLAN overlay capability exchange using data center bridge extension for loss-less delivery of FCoE, in accordance with an embodiment of the present invention.

FIG. 2 is a flowchart depicting operational steps of a VxLAN overlay capability exchange using DCBX for lossless delivery of fibre optic over Ethernet FCoE, in accordance with an embodiment of the present invention.

In step 202, server 102a creates a priority bit re-map table. In the exemplary embodiment, the priority bit re-map table can be used to map the priority bits in the overlay packet to the underlay packet. The priority re-mapping table correlates and helps convert overlay packet priority to underlay packet priority for encapsulation. It also helps switches, which do not understand overlay tunnels, to provide the right kind of priority to packets containing sensitive FCoE or I/O operation overlay packets. Based on the UDP port map, the priority bit re-mapping table helps identify specific types of UDP packets, for example, FCoE packets with known UDP ports as per the UDP port map and corrects the packet priority or provides the right internal queuing priority. Utilizing the UDP port map and the priority bit re-mapping table to match the level of priority of select packet types and protocols, for example, FC and I/O operation packets, to a high level of priority provides loss-less packet delivery through an overlay network. The priority bit re-map table, in conjunction with the port map, aides in the correct identification packet priority with IEEE 802.1p priority bits. The priority bit re-map table is used for adjustments, for example, new IEEE 802.1p priority bits, needed in outer frame tags to ensure appropriate handling for delivery. The priority bit re-map table should be the same for all devices in network 110 and Virtual Tunnel Endpoints (VTEPs). In the exemplary embodiment, the priority re-map table is at server 102b. In other embodiments, a gateway, switch, network appliance, VM, or other computing device acting as a VTEP may create a priority bit re-map table.

In step 204, server 102a defines a new application protocol type-length-value (TLV) for VxLAN protocol. In the exemplary embodiment, this new application TLV may be defined with IEEE 802.1p priority bits on which network 110 can operate for FCoE packets and other sensitive packets. The new application TLV which includes a correlation of IEEE 802.1p priority bits and the UDP port number is propagated using DCBX. The TLV, which includes the IEEE priority bit re-map table map, originates at server 102a, which is a VxLAN Tunnel Endpoint (VTEP) in exemplary embodiments.

In step 206, server 102a creates a new transport protocol port map. In the exemplary embodiment, the transport protocol port map is a UDP port map. The transport protocol port map correlates an inner protocol, for example FCoE, with an outer transport protocol port number. The UDP port map creates a correlation between identified protocols in the overlay packet and UDP port numbers in the underlay transport e.g., UDP. The UDP port map with UDP port numbers aides in the identification of FCoE and other sensitive packets, for example, I/O operation packets, that require high priority handling to ensure packet delivery. The server 102a creates a new DCBX TLV for the transport protocol port map (UDP port map). An example of a UDP port map is shown later in FIG. 3. In some embodiments, a combined table may be created which includes information from the transport protocol port map and the priority bit re-map table. The combined table creates a correlation between one or more inner packet protocols, for example FCoE, one or more outer transport protocol port numbers for example UDP port numbers, and a priority where IEEE 802.1p priority bits may be used to indicate the appropriate level of priority.

In step 208, server 102a utilizes the DCBX TLVs with VxLAN capabilities. The DCBX TLVs containing supported protocols and corresponding transport port numbers along with IEEE 802.1p priority bit re-map tables to provide loss-less delivery of FCoE packets in overlay network. In the exemplary embodiment, utilizing the DCBX TLVs for the VxLAN capabilities, including the transport protocol port map (e.g., UDP port map) and the TLV for the priority bit re-map table along with any other special traffic requirements used by the overlay protocol to support storage traffic or sensitive I/O operation packets, are exchanged and advertised throughout network 110. While originated at server 102a, the DCBX TLVs for IEEE 802.1p priority bit re-map table and the UDP port map may be shared on physical ports at a peer to peer basis using DCBX protocol. The DCBX TLVs may be communicated on a physical port at a peer port to peer port basis from switch to switch and device to device throughout network 110. In order to support the handling of FCoE and I/O operation packets, DCBX protocol can utilize the TLVs to identify sensitive packets based on the UDP port map and exchange IEEE 802.1p priority bit requirements for high priority handling of FCoE and other sensitive packet protocols across network 110.

DCBX protocol propagates the TLVs for UDP port maps and priority bit re-map tables on a peer port to peer port basis, switch to switch and device to device. Additionally, the combined table may be advertised throughout the network by using DCBX protocols and TLV's. In some embodiments, DCBX may be used to advertise each correlated inner protocol, for example FCoE, the UDP port number (e.g. outer transport protocol port number) and level of priority identified by IEEE 802.1p priority bits of the combined table separately. The DCBX TLVs provide identification of packets and set-up reserve priority handling of FCoE packets to support FCoE loss-less transmission through the virtual tunnel. The propagation of the DCBX TLVs provides consistent capabilities throughout network 110. Using DCBX TLVs to exchange capabilities and configurations including IEEE 802.1p priority bit re-map table and UDP port maps, for example, can provide a Converged Enhanced Ethernet (CEE) for transmission of sensitive packets, for example, FCoE packets and other I/O operation packets. When complete, all devices along the path of the virtual tunnel and within network 110 can provide reserve priority resources and special privileges to guarantee delivery for desired sensitive packets. DCBX protocols can advertise the ability to carry FCoE in overlay network 110.

The switching devices along network 110 use DCBX TLVs to identify traffic requirements for high priority handling of FCoE and other sensitive I/O packets to provide a complete path for guaranteed delivery of FCoE from the source of the VTEP, for example, server 102a, to the destination of the VTEP, in this case, server 102b. In the exemplary embodiment, as communicated through the DCBX TLVs, the exchange of capabilities including priority bit re-map table and UDP port map may be set by server 102a and should be accepted by the switches in network 110. The switches can appropriately program both software and hardware to these capabilities. The "willing" bit may be set for these TLVs on the switch side. If the switch can support the IEEE 802.1p priority bits, then it can set the IEEE 802.1p priority bits in the hardware. Conversely, if the switch cannot support the IEEE 802.1p priority bits, then it should set the appropriate policies so that the FCoE packets with the desired UDP port numbers can be given higher priority in the switch. In some embodiments, the intermediate switches in network 110 may not be able to support all the priorities required by VxLAN protocols for FCoE. For those switches unable to support the necessary priorities, the switches may install policies to give high priority to the packets with specified UDP port numbers that may be tagged with IEEE 802.1p priority bits. These policies may be manually or automatically installed to reserve high priority handling for packets carrying FCoE and other I/O packet with specified UDP ports.

In step 210, server 102a receives an FCoE packet from server storage or VM on server 102a and encapsulates it for FCoE. Steps 210 through step 218 will follow the path of a packet from server 102a to server 102b through the VxLAN network (network 110).

In step 212, server 102a creates VxLAN header for FCoE frames. In the exemplary embodiment, the VxLAN header may include the 24 bit field for VxLAN overlay network identification of network 110.

In step 214, server 102a applies the UDP/IP headers identifying source port and IP address of originating VTEP.

In step 216, server 102a tags the frame with priority bits in a VLAN tag to ensure loss-less delivery of FCoE frames and applies an outer Ethernet header with a MAC address of destination VTEP. Utilizing the port map and the priority bit re-map table, the outer frame is encapsulated using IEEE 802.1p priority bits tagged in the VLAN header. The new IEEE 802.1p priority bits are applied using the port number from the port map and the priority bit re-map table. In this manner, the exemplary embodiment of the present invention may utilize VxLAN overlay as an underlay to carry FCoE frames with IEEE 802.1p priorities enabled. The FCoE frame priority bits should be re-mapped to the VxLAN underlay header by server 102a.

In some embodiments, FC frames may be received by VxLAN gateway 103a from network 111, which is a non-virtualized cloud. In these cases, VxLAN gateway 103a may encapsulate FC packets in FCoE if from SAN or other FC source, apply VxLAN header, encapsulate FCoE frame in UDP/IP header, apply outer Ethernet header and VLAN IEEE 802.1p priority bit tags and apply other services as needed for transition from network 111 to network 110, and forward to server 102a. Similarly, VxLAN gateways may remove outer Ethernet headers, de-encapsulate FCoE frames from UDP/IP headers, remove VxLAN headers and FCoE encapsulation to exit network 110 and enter a non-VxLAN network. In some embodiments, VxLAN gateways 103a and 103b may perform VTEP functions and provide tunnel endpoints.

In step 218, server 102a forwards VxLAN packets with FCoE to the virtual tunnel in network 110. In the exemplary embodiment, server 102a is a source VTEP for the virtual tunnel. The FCoE packet encapsulated in a VxLAN header for overlay and tagged with IEEE 802.1p priority bits transverses network 110 utilizing tunneling protocol to deliver the encapsulated packets to the destination VTEP. The destination VTEP, for example, server 102b may remove outer header, remove UDP/IP headers, remove VxLAN headers, and de-encapsulate FCoE. The FC packets may be delivered, for example, to FC source on server 102b. In some embodiments, VTEP at server 102b, for example, may forward FCoE packets to VxLAN gateway 103b to process and route to a destination on a non-VxLAN network.

FIG. 3 is an example of a UPD port map, in accordance with an embodiment of the present invention. The UDP port map may identify the UDP port numbers to support the various protocols in the VxLAN network. This information can be propagated by the associated DCBX TLV created for the UDP port map.

Figure 4:
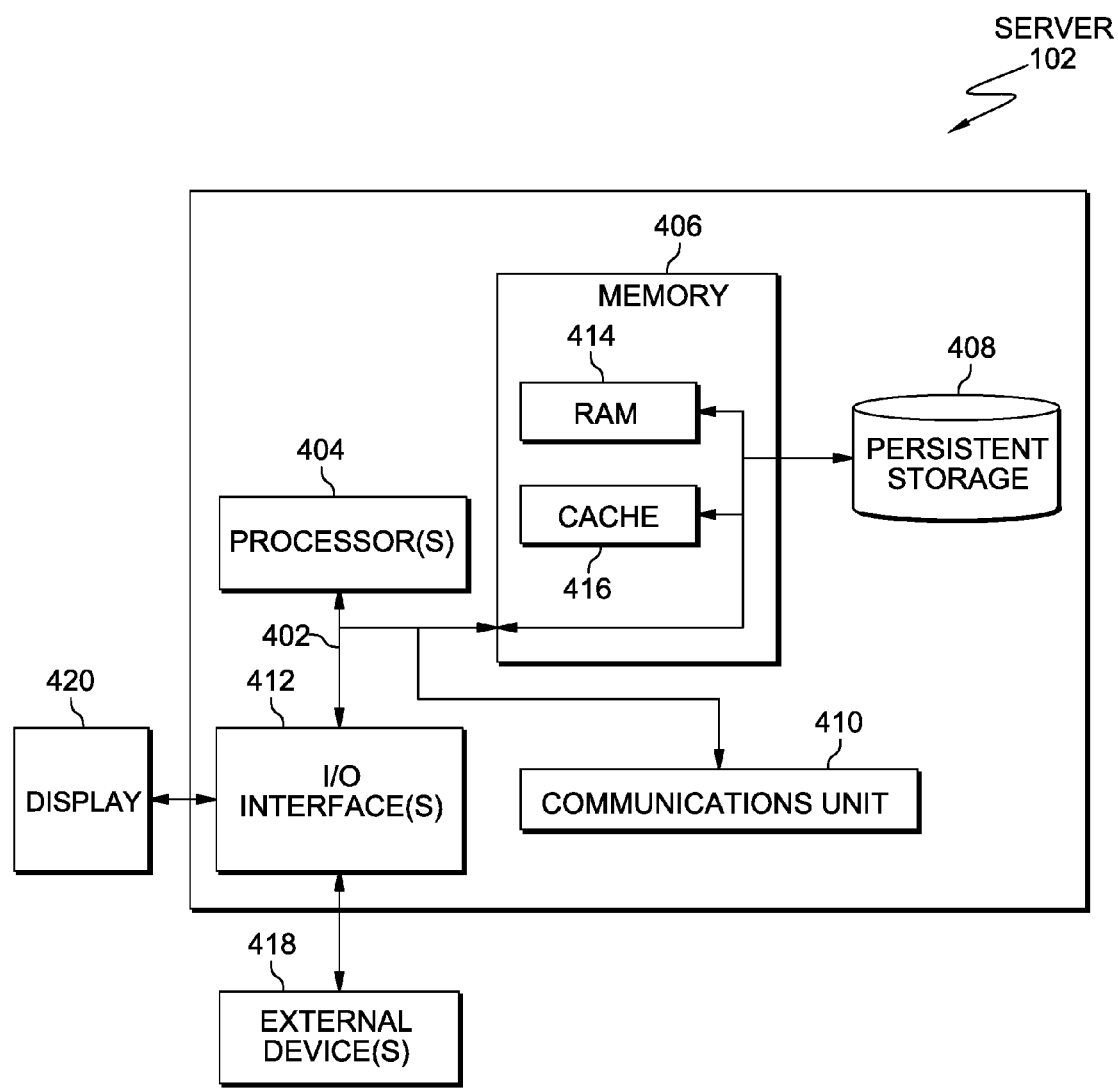
FIG. 4 depicts a block diagram of components of a server capable of executing the initiation of a capability exchange for a VxLAN network, in accordance with an embodiment of the present invention.

FIG. 4 depicts a block diagram of components of server 102a, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 102a includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 110 and VxLAN gateways 103a and 103b and servers 102a and 102b. In these examples, communications unit 410 includes one or more network interface cards. Communications unit 410 may provide communications through the use of either or both physical and wireless communications links.

I/O interface(s) 412 allows for input and output of data with other devices that may be connected to server 102a and server 102b. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, the implementation of VxLAN and DCBX to provide loss-less transmission of sensitive packets over network 110, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    a computing device creating a transport protocol port map that correlates one or more inner protocols with one or more outer transport protocol port numbers;
    the computing device creating a priority bit re-map table that correlates the one or more outer transport protocol port numbers with one or more levels of priority;
    the computing device receiving a packet having an associated protocol and an associated port number;
    the computing device determining, based on the associated protocol and the associated port number, that the packet requires a level of priority of the one or more levels of priority that guarantees loss-less delivery of the packet; and
    responsive to a determination that the level of priority associated with a priority bit in a header of the packet does not match a level of priority associated with a port number in the header of the packet, the computing device changing the priority bit in the header of the packet to a priority bit associated with a level of priority that matches the level of priority associated with the port number, wherein changing includes tagging the header of the packet with an IEEE 802.1p priority bit.

2. The method of claim 1, further comprising the computing device creating a combined table that correlates the one or more inner protocols, the one or more outer transport protocol port numbers, and the one or more levels of priority.

3. The method of claim 2, further comprising the computing device advertising, using a data center bridge exchange (DCBX) protocol, the combined table to a plurality of other computing devices.

4. The method of claim 1, further comprising the computing device forwarding the packet to a destination server, wherein the destination server removes one or more headers from the packet.

5. The method of claim 1, wherein the one or more inner protocols include one or more protocols used to carry at least one of a fibre channel packet or an I/O operation packet that corresponds to an outer transport protocol port number requiring a level of priority of the one or more levels of priority that guarantees loss-less delivery.

6. A computer program product comprising: one or more non-transitory computer-readable storage media devices and program instructions stored on one or more non-transitory computer-readable storage media devices, the stored program instructions comprising: program instructions to create a transport protocol port map that correlates one or more inner protocols with one or more outer transport protocol port numbers; program instructions to create a priority bit re-map table that correlates the one or more outer transport protocol port numbers with one or more levels of priority; program instructions to receive a packet having an associated protocol and an associated port number; and program instructions to determine, based on the associated protocol and the associated port number, that the packet requires a level of priority of the one or more levels of priority that guarantees loss-less delivery of the packet; and responsive to a determination that the level of priority associated with a priority bit in a header of the packet does not match a level of priority associated with a port number in the header of the packet, program instructions to change the priority bit in the header of the packet to a priority bit associated with a level of priority that matches the level of priority associated with the port number, wherein changing includes tagging the header of the packet with an IEEE 802.1p priority bit.

7. The computer program product of claim 6, wherein the stored program instructions further comprise program instructions to create a combined table that correlates the one or more inner protocols, the one or more outer transport protocol port numbers, and the one or more levels of priority.

8. The computer program product of claim 7, wherein the stored program instructions further comprise program instructions to advertise, using a data center bridge exchange (DCBX) protocol, the combined table to a plurality of other computing devices.

9. The computer program product of claim 6, wherein the stored program instructions further comprise program instructions to forward the packet to a destination server, wherein the destination server removes one or more headers from the packet.

10. The computer program product of claim 6, wherein the one or more inner protocols includes one or more protocols used to carry at least one of a fibre channel packet or an I/O operation packet that corresponds to an outer transport protocol port number requiring a level of priority of the one or more levels of priority that guarantees loss-less delivery.

11. A computer system comprising: one or more computer processors; one or more non-transitory computer-readable storage media; program instructions stored on the non-transitory computer-readable storage media for execution by at least one of the one or more processors, the stored program instructions comprising: program instructions to create a transport protocol port map that correlates one or more inner protocols with one or more outer transport protocol port numbers; program instructions to create a priority bit re-map table that correlates the one or more outer transport protocol port numbers with one or more levels of priority; program instructions to receive a packet having an associated protocol and an associated port number; and program instructions to determine, based on the associated protocol and the associated port number, that the packet requires a level of priority of the one or more levels of priority that guarantees loss-less delivery of the packet; and responsive to a determination that the level of priority associated with a priority bit in a header of the packet does not match a level of priority associated with a port number in the header of the packet, program instructions to change the priority bit in the header of the packet to a priority bit associated with a level of priority that matches the level of priority associated with the port number, wherein changing includes tagging the header of the packet with an IEEE 802.1p priority bit.

12. The computer system of claim 11, wherein the stored program instructions further comprise program instructions to create a combined table that correlates the one or more outer transport protocol port numbers, and the one or more levels of priority.

13. The computer system of claim 12, wherein the stored program instructions further comprise program instructions to advertise, using a data center bridge exchange (DCBX) protocol, the combined table to a plurality of other computing devices.

14. The computer system of claim 11, wherein the stored program instructions further comprise program instructions to forward the packet to a destination server, wherein the destination server removes one or more headers from the packet.

15. The computer system of claim 11, wherein the one or more inner protocols includes one or more protocols used to carry at least one of a fibre channel packet or an I/O operation packet that corresponds to an outer transport protocol port number requiring a level of priority of the one or more levels of priority that guarantees loss-less delivery.

* * * * *